United States Patent [19]

Young

[11] Patent Number: 4,940,194

[45] Date of Patent: Jul. 10, 1990

[54] ELECTRONIC CASTING BRAKE

[75] Inventor: John N. Young, Fairfax, Calif.

[73] Assignee: Pacific Products, Kentfield, Calif.

[21] Appl. No.: 281,449

[22] Filed: Dec. 8, 1988

Related U.S. Application Data

[63] Continuation-in-part of Ser. No. 108,951, Oct. 16, 1987, abandoned.

[51] Int. Cl.⁵ .................. A01K 89/155; A01K 89/033
[52] U.S. Cl. .................................... 242/288; 242/223; 188/267; 310/93
[58] Field of Search ............... 242/84.52 B, 84.5 A, 242/84.51 A, 84.1 A, 288, 286; 188/267, 159, 161, 164; 310/93, 105

[56] References Cited

U.S. PATENT DOCUMENTS

| | | | |
|---|---|---|---|
| 4,535,954 | 8/1985 | Worth et al. | 242/84.52 B |
| 4,572,454 | 2/1986 | Furomoto | 242/84.52 B |
| 4,674,699 | 6/1987 | Fukushima et al. | 242/84.52 B |
| 4,710,689 | 12/1987 | Uetsuki et al. | 242/288 |
| 4,714,208 | 12/1987 | Holahan et al. | 242/84.52 B |
| 4,722,492 | 2/1988 | Uetsuki et al. | 242/84.52 B |
| 4,779,814 | 10/1988 | Uetsuki et al. | 242/84.52 B |

FOREIGN PATENT DOCUMENTS

| | | | |
|---|---|---|---|
| 100570 | 7/1983 | Japan | 242/84.52 B |
| 178070 | 11/1984 | Japan | 242/84.52 B |
| 1575 | 1/1987 | Japan | 242/84.52 B |

*Primary Examiner*—Katherine A. Matecki
*Attorney, Agent, or Firm*—Flehr, Hohbach, Test, Albritton & Herbert

[57] ABSTRACT

A casting reel (10) has a reel housing (22). A reel spool shaft (14) is rotatably mounted in the reel housing. A magnetic disc (12) is connected to rotate with the shaft (14). An electrical coil (20) produces an output signal in response to movement of the disk (12). A control circuit (28) is connected to receive the output signal from the electrical coil (20). The control circuit (28) has a thyristor (52) which produces a drag signal that varies based on the output signal from the electrical coil. The electrical coil and magnetic disk provide a variable drag on the reel spool shaft (14). The variable drag changes based on the drag signal from the thyristor (52).

12 Claims, 4 Drawing Sheets

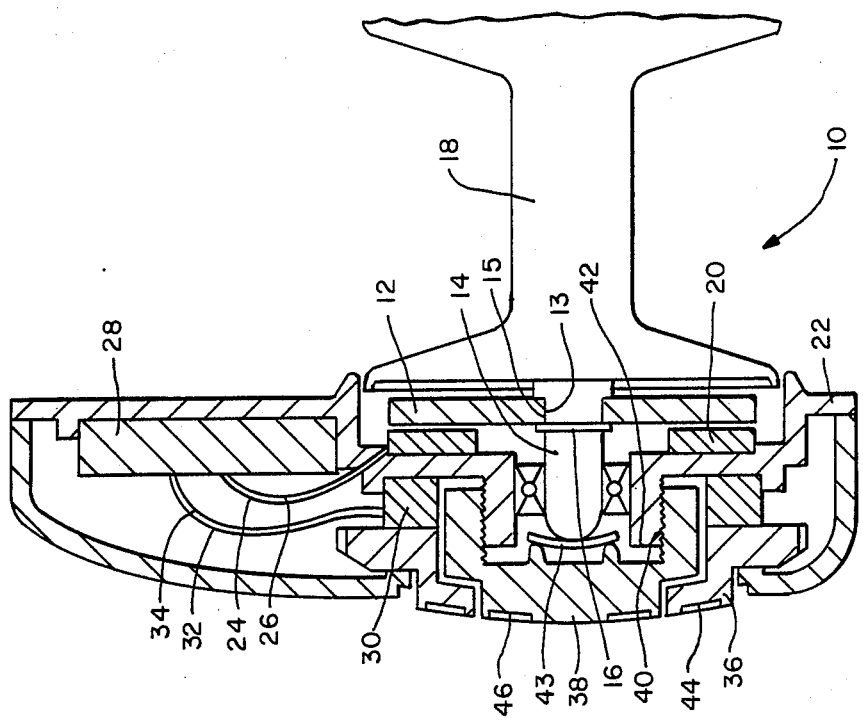
FIG.—1
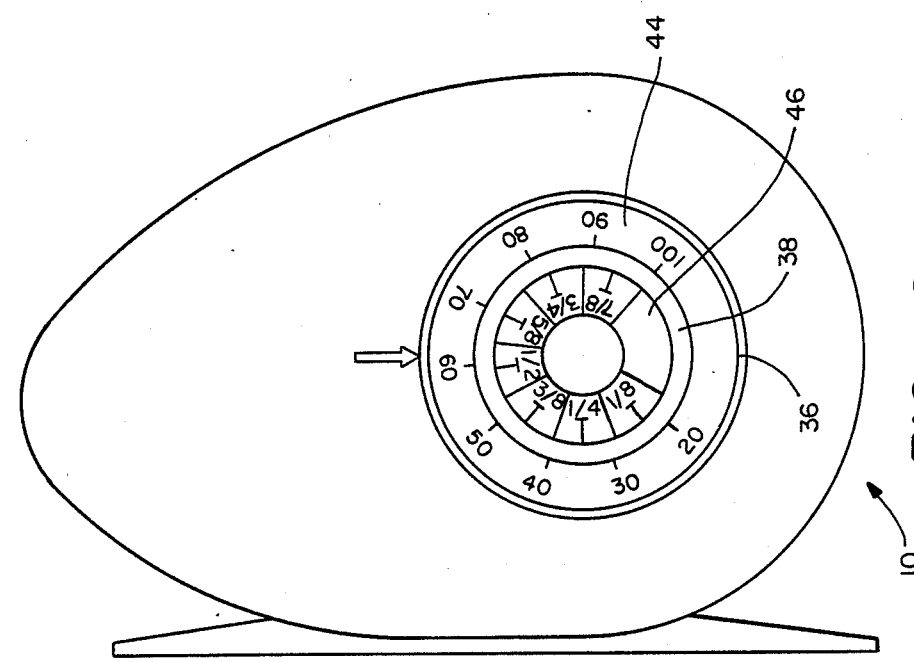
FIG.—2

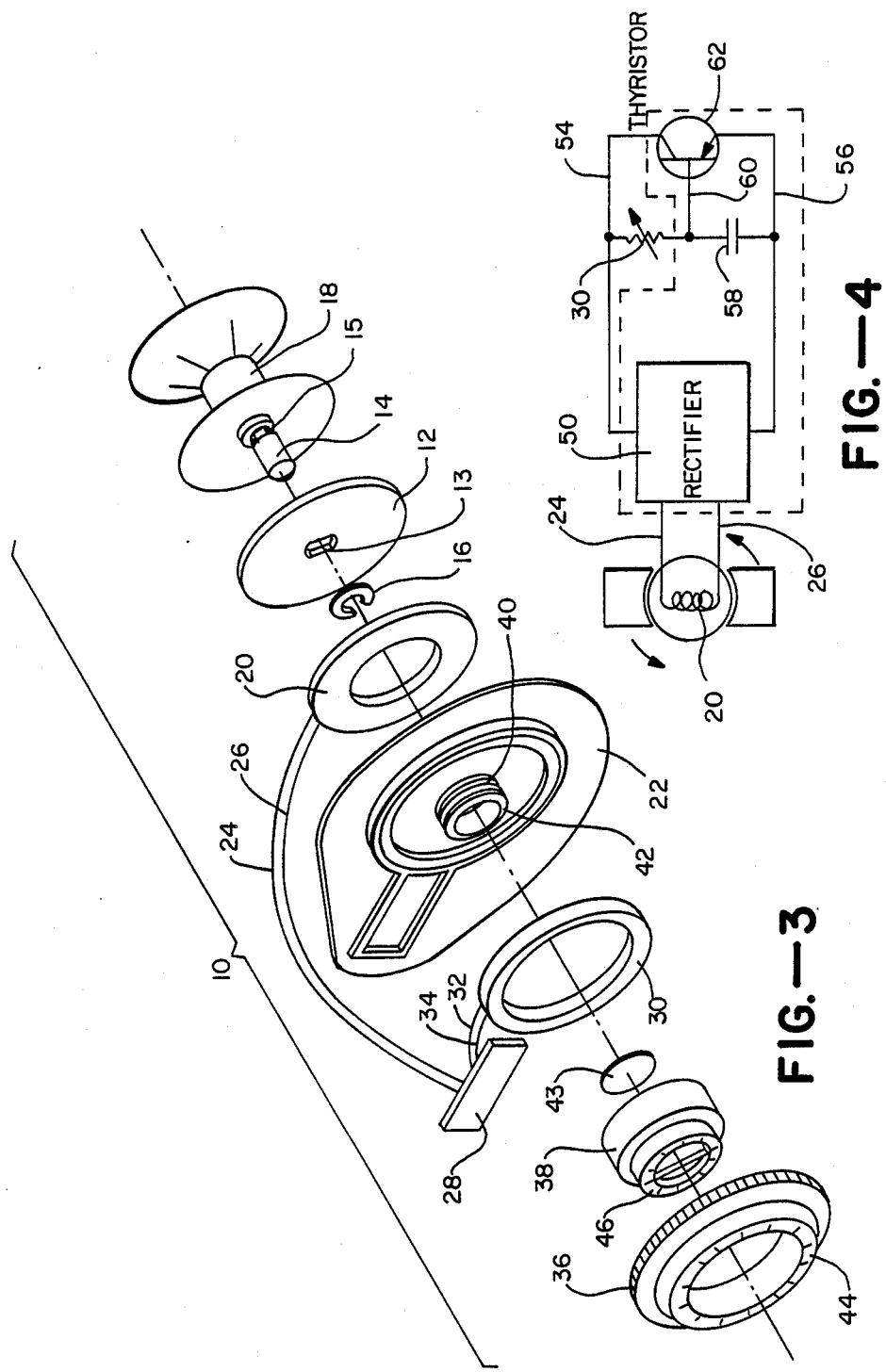

ELECTRONIC CASTING BRAKE

ORIGIN OF APPLICATION

This application is a continuation-in-part of application Ser. No. 108,951, filed Oct. 16, 1987, now abandoned.

BACKGROUND OF THE INVENTION

1. Field of the Invention:

The present invention relates generally to an improved form of a casting reel in which backpressure or casting drag offered by the reel is dynamically controlled during a cast to give a variable casting drag. More particularly, it relates to such a casting reel with such a dynamically controlled variable casting drag that will meet different drag requirements in the trajectory of a cast. Most especially, it relates to such a casting reel in which the dynamic control is obtained electronically in a self contained system which does not require a battery or external power supply.

2. Description of the Prior Art:

It is well known in the casting reel art to provide a mechanical drag element in the reel which can be adjusted to provide a constant amount of drag during a cast using the reel. Such drag elements endeavor to control the amount of backpressure or casting drag offered by a spool of the reel so that precise casting distance may be achieved with little or no spool overrun or birdnesting. However, at different points in the trajectory of the lure, there are different casting drag requirements. It would be desirable to provide a variable casting drag that would match and follow these different drag requirements. Since a cast is generally of short duration and the casting drag requirements vary over a relatively short period of time, the action of a varying casting drag needs to be fully automatic within an externally preset range.

Recognizing this need, such a variable casting drag is provided in published Japanese Application (Kokai) No. 58-100570, published July 8, 1983. The '570 publication describes a system providing additive interaction of two generators to produce a complex output braking voltage. As shown in FIGS. 2 and 3 of the publication, the two generators are generator 1 comprising coils 52 and generator 2 comprising coils 53. FIGS. 4 and 6 show the circuit and output of generator 1, and FIGS. 5 and 7 show the circuit and output of generator 2. FIG. 9 shows the complex brake curve applied to the spool shaft as a result of the interaction of the two generators. While this system does provide variable drag at different points in the cast and thus apparently helps alleviate spool overrun or birdnesting, casting distance of this system will vary in approximately the same relationship with respect to the strength of a cast as with no braking action. It would be desirable for a user to be able to select a desired casting distance with a reel, then place the cast at that distance within a range of casting strengths. This would enable precision placement of the cast relatively independently of casting skill.

SUMMARY OF THE INVENTION

Study of casting drags has shown that two types of drag are necessary for optimum casting drag performance: a fixed, or constant drag, and a variable drag of the type described above. Since adjustment of one of these drags would necessarily affect the other, it would be desirable to have a control method that would indicate the interaction and intereffect of the two drags.

Accordingly, it is an object of this invention to provide a casting reel which is capable of providing a variable drag on the spool of the reel at different points in the trajectory of a cast in an improved manner.

It is another object of the invention to provide such a casting reel including a system for providing a constant drag and a variable drag which accounts for interaction between the two forms of drag.

It is still another object of the invention to provide such a casting reel in which an improved form of variable drag compensates for different strength casts, so that the reel can be adjusted to provide a predetermined casting distance, relatively independently of casting skill.

It is a further object of the invention to provide such a casting reel in which drag is varied and timed in its inception through use of an electronic system which generates its own power.

These and related objects may be achieved through use of the novel casting reel herein disclosed. It has been discovered that a casting reel will produce a relatively constant casting distance with casts of different strength if both a variable extent of braking and a variable timing of the inception of the variable braking are provided with the casts of different strength. A casting reel in accordance with this invention has a reel housing. A reel spool shaft is rotatably mounted in the reel housing. A sensing element is coupled to the rotatable shaft for producing an output signal in response to rotation of the rotatable shaft. A control circuit is connected to receive the output signal from the sensing element. The control circuit is configured to produce a drag signal which varies based on the output signal from the sensing element. A variable drag means is coupled to the reel spool shaft. The variable drag means is responsive to the drag signal from the control circuit.

The attainment of the foregoing and related objects, advantages and features of the invention should be more readily apparent to those skilled in the art after review of the following more detailed description of the invention, taken together with the drawings, in which:

BRIEF DESCRIPTION OF THE DRAWINGS

FIG. 1 is a cross-section view of a casting reel in accordance with the invention.

FIG. 2 is an end view of the casting reel shown in FIG. 1.

FIG. 3 is an exploded perspective view of the casting reel shown in FIGS. 1 and 2.

FIG. 4 is a circuit schematic of a drag control system portion used in the casting reel of FIGS. 1-3.

DETAILED DESCRIPTION OF THE INVENTION

Figure 5:
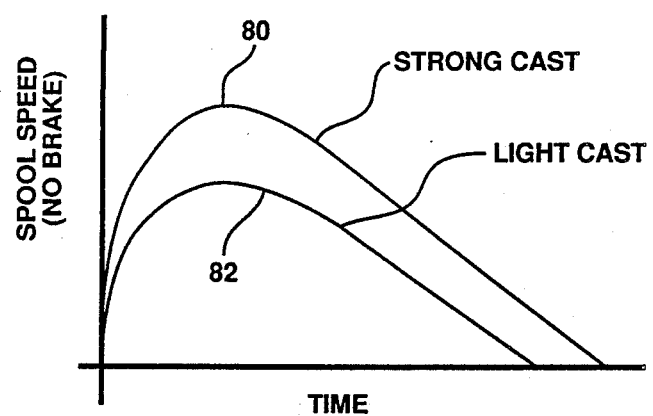
FIG. 5 is a graph of spool speed against time, useful for understanding operation of the invention.

Turning now to the drawings, more particularly to FIGS. 1-3, there is shown a casting reel 10 in accordance with the invention. In the casting reel 10, a magnetic disc 12 is fixedly attached to spool shaft 14 by means of mating flat surfaces 13 and 15, respectively on the magnetic disk 12 and the spool shaft 14, and a retaining ring 16, so that spool 18 and the magnetic disc 12 rotate as a unit. An electrical coil 20 is attached to reel body 22 in close proximity to the magnetic disc 12. Output leads 24 and 26 of the coil 20 are connected to a control circuit 28 mounted inside the reel body 22. A variable circuit element 30, such as a variable resistor, is also connected to the control circuit 28 by leads 32 and 34. A variable capacitor or other variable circuit element could also be used in place of the variable resistor 30. The variable resistor 30 is mechanically connected to and controlled by external control knob 36. A secondary control knob 38 is mounted to rotate within control knob 36. The secondary control knob 38 is threaded at 40 to portion 42 of the reel body 22. Rotation of the secondary control knob causes it to apply pressure on drag washer 43, in turn increasing frictional pressure applied to spool shaft 14 by the drag washer 43. A drag control dial 44 is fixedly attached to the control knob 36, and a drag dial 46 is fixedly attached to the secondary control knob 38. The dials 44 and 46 are calibrated to read relative to each other, so that changing either control knob 36 or 38 causes a changed reading on the other control knob's dial setting.

The two drag knobs 36 and 38 are not mechanically connected. They interact only in the braking effect that they both have on the spool 18 while casting a lure. The mechanical brake provided by adjustment knob 38 does not affect the electronic brake setting adjusted by the knob 36. However, the drag on the spool 18 and the subsequent casting distance is affected by changing either setting, and the dials 44 and 46 are so arranged to show the interactive effect of the two brakes on the spool 18.

By way of example, assume a user is casting a ½ ounce lure and wishes to cast a 60 foot distance. The dial settings shown in FIG. 2 are correct for this condition. If the user wishes to shorten the casting distance to 50 feet, this can be done two ways: (1) The electronic knob 36 can be left as is and the mechanical brake 38 rotated counterclockwise to align the ½ ounce lure setting on dial 46 with the new distance of 50 feet. Internally, this will increase the mechanical pressure from washer 43 against the spool shaft 14. (2) The mechanical brake knob 38 can be left as is and the electronic control knob 36 rotated clockwise to align the ½ ounce lure setting and the 50 foot distance mark. In both adjustment cases, the user can also read what effect these setting changes would have on casting distance for other lure weights. Although the drags themselves are not interconnected, their effect on the spool 18 is interactive, and the two dials indicate this interactive effect.

In operation of the casting reel 10, spool 18 rotates at a relatively high speed, which causes magnetic disc 12 to rotate rapidly in close proximity to coil 20, producing a voltage developed across the coil output leads 24 and 26. The control circuit 28 controls current flow through coil 20, which in turn controls the braking action feedback applied through the magnetic disc 12 to the spool 18. The variable resistor 30, as adjusted by control knob 36, modifies operation of the control circuit 28.

FIG. 4 shows details of the control circuit 28. Magnetic disc 12 and coil 20 form a generator connected by the leads 24 and 26 to a rectifier 50, for example, a diode bridge, in the control circuit 28. The rectifier 50 is connected to current flow electrodes of thyristor 52 by lines 54 and 56. Variable resistor 30 and capacitor 58 are connected between lines 54 and 56, and to a control electrode of the thyristor 52 by line 60. In operation, voltage across the generator 12, 20 drives an alternating current, which is rectified and supplied in the circuit 28. As voltage builds across the capacitor to a necessary level, the thyristor fires to act as a low resistance, high current path to the generator output. This greatly increased flow of current through the thyristor 52 also causes greatly increased current flow through the generator, which constitutes a drag signal and causes increased drag on the spool 18 as described above.

As explained above, a fixed braking bias is also applied to the spool 18, as set with the secondary control knob 38. This fixed braking bias, or drag, is adjusted to compensate for various lure weights. The control knob 36 and its control system are generally set to control casting distance, while the knob 38 and its mechanical drag system are generally set to compensate for various lure weights. However, it should be apparent that changing the setting of one of these drag systems will also affect the functioning of the other drag system. Therefore, control knob 38, which controls the fixed braking bias, is located to rotate within the control knob 36, so that calibration dials 44 and 46 of each knob 36 and 38 have interactive readings. Thus, when one control knob is moved, its dial produces a new reading on the dial of the other knob.

In operation of the casting reel 10, it would be proper to characterize the drag produced by the control circuit 28 as regulating itself in two ways, i.e., in its strength and its timing. The braking strength is controlled in two ways:

1. An increased speed of rotation produces an increased output voltage, which is conventional, and
2. The initial braking force when the brake triggers is applied more quickly than other systems, since there is a very high initial current caused by the short circuit applied to the system when the brake "fires". Other systems including that of the '570 Japanese publication, have the braking current just follow the voltage increase/decrease as the spool rotates. The braking action of the reel 10 is quicker and more positive once the threshold voltage of the thyristor 62 is exceeded.

The braking force timing is controlled by the RC network that fires the thyristor 62. In a strong cast, initial output voltage of the generator is large and causes the RC network to fire the thyristor sooner, which applies braking action earlier to counteract the stronger cast. Conversely, in a light cast, the output voltage is lower, which causes a delay in firing the thyristor, which delays the brake and again compensates and allows more casting distance with a weaker cast.

Figure 6:
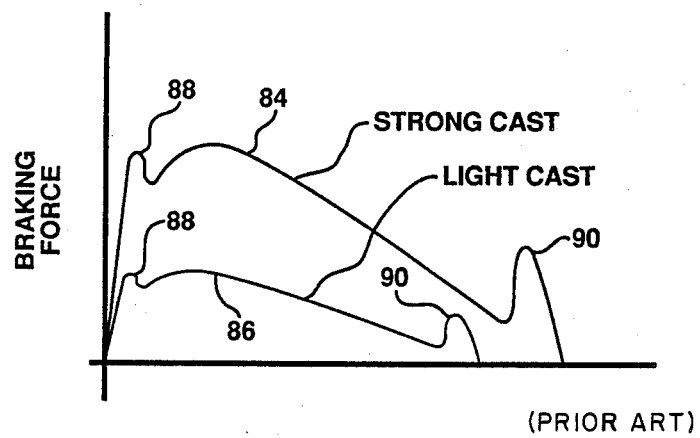
FIG. 6 is a graph of braking force against RPM for a prior art casting reel, useful for understanding operation of the invention.
Figure 7:
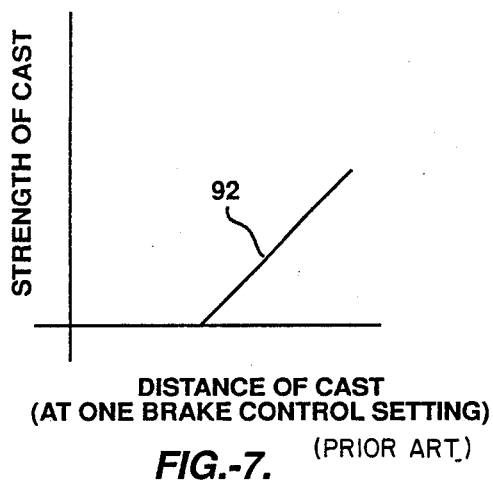
FIG. 7 is a graph of cast strength against distance of cast at one brake control setting for the prior art casting reel represented in the graph of FIG. 6, useful for understanding operation of the invention.

The operation of the casting reel 10 and the difference between its operation and that of prior art casting reels can be further understood by referring to FIGS. 5-9. FIG. 5 shows a representative plot of spool speed (RPM) on the Y axis against time on the X axis for a conventional casting reel with no braking. Curve 80 is the spool speed for a strong cast, and curve 82 is the spool speed for a light cast. FIG. 6 shows braking force on the Y axis against time on the X axis curves 84 and 86 for a casting reel as described in the '570 publication. Curve 84 shows the braking force for a strong cast, and curve 86 is the braking force for a light cast. Note that the curves 84 and 86, except for the superimposed portions 88 and 90 produced by a second braking generator in the casting reel described in that publication, track the spool speed with time curves. This tracking characterizes almost all other casting brake designs, since they all have spool speed and braking force curves matched. FIG. 7 is a representative plot of cast strength on the Y axis against casting distance on the X axis at one brake control setting with the casting reel of the '570 Japanese publication. Curve 92 shows a substantial increase in casting distance with increasing cast strength, and is typical of prior art casting brake designs.

Figure 8:
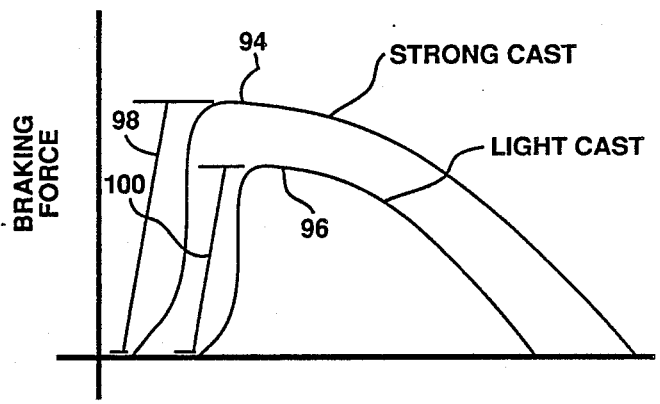
FIGS. 8 and 9 are, respectively, graphs corresponding to those of FIGS. 6 and 7, but for a casting reel in accordance with this invention.
Figure 9:
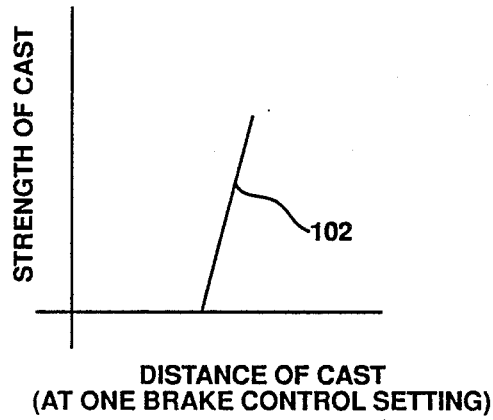

FIG. 8 shows a plot of braking force on the Y axis against time on the X axis for the casting reel 10. Curve 94 shows the braking force for a strong cast, and curve 96 shows the braking force for a light cast. Note that the curves 94 and 96 both commence to the right of the intersection of the X and Y axes, while the curves 84 and 86 both commence at the intersection of the X and Y axes. Curve 96 commences later in time that curve 94, due to the longer time it takes for the RC network to reach the threshold voltage of the thyristor 62 with a light cast. Note also that the initial portions 98 and 100 of the curves 94 and 96 increase much faster with time once the braking action commences, compared with the initial portions of the curves 84 and 86. This is due to the rapid firing of the thyristor 62 once its threshold voltage is reached. The braking forces represented by the curves 94 and 96 result in the cast distance curve 102 relative to cast strength shown in FIG. 9, in which the cast distance changes very little with strong and light casts.

It should now be readily apparent to those skilled in the art that a novel casting reel capable of achieving the stated objects of the invention has been provided. The magnetic drag element and its control circuit provide a variable drag on the spool of the reel at different points in the trajectory of a cast. The mechanical drag system and the magnetic drag system interact to affect the drag produced by the other system to provide optimum operation of the casting reel. The magnetic drag system for producing drag varying during the trajectory of a cast generates its own power for operation. The magnetic drag system produces drag which is self-regulated both as to braking strength and as to brake timing.

It should further be apparent to those skilled in the art that various changes in form and details of the invention as shown and described may be made. For example, a digital control circuit employing a counter could be substituted for the analog circuit shown, with the drag signal varying with rate of change of the count. It is intended that such changes be included within the spirit and scope of the claims appended hereto.

What is claimed is:

1. A casting reel, which comprises a reel housing, a reel spool shaft rotatably mounted in said reel housing, a sensing element coupled to said rotatable shaft for producing an output signal in response to rotation of said rotatable shaft, a control circuit connected to receive the output signal from said sensing element, said control circuit including means for producing a drag signal which varies in level and in time of initiation based on the output signal from said sensing element, and a variable drag means coupled to said reel spool shaft, said variable drag means being responsive to the drag signal from said control circuit in a self regulating arrangement both as to extent of braking action and a change of delay in time of initiating braking action of said variable drag means after rotation of said rotatable shaft begins, said sensing element comprising a magnetic member rotatable with said shaft and a fixed electrical coil positioned adjacent to a path of rotation of said magnetic member, said electrical coil and said magnetic member also comprising said variable drag means, said electrical coil being connected to receive the drag signal from said control circuit, said electrical coil and said magnetic member further comprising a generator providing power for said control circuit and said variable drag means, said casting reel being free of a battery and a power supply external to said casting reel.

2. The casting reel of claim 1 in which said control circuit additionally comprises a variable circuit element, said reel includes a means for adjusting said variable circuit element, and said means for producing a drag signal is responsive to adjustment of said variable circuit element to change the drag signal to change the extent of braking action and the delay in the time of initiating the braking action.

3. The casting reel of claim 2 in which said reel further includes a mechanical drag element engaging said reel spool shaft and a means for adjusting an amount of drag produced by said mechanical drag element.

4. The casting reel of claim 3 including indicia for said variable circuit element adjusting means and said mechanical drag element and in which said variable circuit element adjusting means, said mechanical drag element adjusting means and said indicia for said variable circuit element adjusting means and said mechanical drag element are positioned with respect to each other and said variable circuit element adjusting means and said mechanical drag element adjusting means are free of mechanical connection to one another during use of said casting reel so that adjustment of one of said variable circuit element and said mechanical drag element changes readout from said indicia of the other of said variable circuit element and said mechanical drag element.

5. The casting reel of claim 4 in which said variable circuit element adjusting means and said mechanical drag element adjusting means comprise rotatable knobs freely rotatable with respect to each other and each including the indicia positioned with respect to one another so that the indicia of each of said rotatable knobs is interactively readable with the indicia of the other of said rotatable knobs when either of said rotatable knobs is rotated with respect to the other of said rotatable knobs.

6. The casting reel of claim 5 in which said variable circuit element comprises a variable resistor.

7. The casting reel of claim 1 in which said control circuit comprises a variable resistor and a capacitor connected to a switching device.

8. A casting reel, which comprises a reel housing, a reel spool shaft rotatably mounted in said reel housing, a sensing element coupled to said rotatable shaft for producing an output signal in response to rotation of said rotatable shaft, a control circuit connected to receive the output signal from said sensing element, said control circuit being configured to produce a drag signal which varies based on the output signal from said sensing element, and a variable drag means coupled to said reel spool shaft, said variable drag means being responsive to the drag signal from said control circuit, said sensing element comprising a magnetic member rotatable with said shaft and a fixed electrical coil positioned adjacent to a path of rotation of said magnetic member, said electrical coil and said magnetic member also comprising said variable drag means, said electrical coil being connected to receive the drag signal from said control circuit, said control circuit comprising a rectifier connected to receive the output signal from said electrical coil, a capacitor connected to receive the output signal after rectification, and a thyristor having a control electrode connected to said capacitor and current flow electrodes connected to supply the drag signal to said fixed electrical coil.

9. The casting reel of claim 8 in which said control circuit additionally comprises a variable resistor serially connected with said capacitor to said rectifier, and said reel includes a means for adjusting said variable resistor.

10. The casting reel of claim 9 in which said reel further includes a mechanical drag element engaging said reel spool shaft and a means for adjusting an amount of drag produced by said mechanical drag element.

11. The casting reel of claim 10 in which said variable resistor adjusting means, said mechanical drag element adjusting means and said indicia for said variable circuit element adjusting means and said mechanical drag element are positioned with respect to each other so that adjustment of one of said variable resistor and said mechanical drag element with one of said variable resistor adjusting means and said mechanical element adjusting means changes overall drag of said casting reel and the effect of such change in the overall drag of said casting reel is apparent on the other of said variable resistor adjusting means and said mechanical drag element adjusting means.

12. The casting reel of claim 11 in which said variable resistor adjusting means and said mechanical drag element adjusting means comprise rotatable knobs positioned with respect to one another so that each of said rotatable knobs is interactively readable with the other of said rotatable knobs when another of said rotatable knobs is rotated.

* * * * *